United States Patent
Tamura (10) Patent No.: US 9,531,904 B2
(45) Date of Patent: Dec. 27, 2016

(54) INFORMATION PROCESSING APPARATUS, CONTROL METHOD OF INFORMATION PROCESSING APPARATUS, AND RECORDING MEDIUM

(71) Applicant: CANON KABUSHIKI KAISHA, Tokyo (JP)

(72) Inventor: Makiya Tamura, Tokyo (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

(21) Appl. No.: 14/931,703

(22) Filed: Nov. 3, 2015

(65) Prior Publication Data
US 2016/0127596 A1 May 5, 2016

(30) Foreign Application Priority Data

Nov. 5, 2014 (JP) .................. 2014-225401

(51) Int. Cl.
*H04N 1/21* (2006.01)
*H04N 1/32* (2006.01)
*G06F 3/12* (2006.01)
*H04N 1/327* (2006.01)

(52) U.S. Cl.
CPC ............ *H04N 1/21* (2013.01); *G06F 3/126* (2013.01); *G06F 3/1211* (2013.01); *G06F 3/1295* (2013.01); *G06F 3/1296* (2013.01); *H04N 1/327* (2013.01); *H04N 1/32448* (2013.01); *H04N 2201/0094* (2013.01)

(58) Field of Classification Search
None
See application file for complete search history.

(56) References Cited

U.S. PATENT DOCUMENTS

2007/0008579 A1\* 1/2007 Kawasaki ............ G06F 3/1207 358/1.15
2014/0189217 A1\* 7/2014 Marukame ............ G06F 3/0679 711/103

FOREIGN PATENT DOCUMENTS

JP 2009-83419 A 4/2009
JP 02009212998 A \* 9/2009

\* cited by examiner

*Primary Examiner* — Fan Zhang
(74) *Attorney, Agent, or Firm* — Canon USA, Inc. IP Division (57) ABSTRACT

An information processing apparatus is configured to adjust a data size of a facsimile transmission job. The data size exceeds a buffer size of an image processing apparatus if the acquired data size of the facsimile transmission job is smaller than or equal to the acquired buffer size of the image processing apparatus, and transmit the facsimile transmission job to the image processing apparatus.

9 Claims, 9 Drawing Sheets

DEVICE BUFFER SIZE

| ID | Buffer Size |
|---|---|
| device A | 32 KB |
| device B | 64 KB |
| device C | 128 KB |
| ... | ... |

# INFORMATION PROCESSING APPARATUS, CONTROL METHOD OF INFORMATION PROCESSING APPARATUS, AND RECORDING MEDIUM

BACKGROUND OF THE INVENTION

Field of the Invention

One disclosed aspect of the embodiments relates to an information processing apparatus, a control method of an information processing apparatus, and a recording medium.

Description of the Related Art

Conventionally, a function of transmitting image data from a terminal such as a personal computer (PC) to an information processing apparatus, for example, an image processing apparatus through a network and causing the image processing apparatus to perform printing or facsimile transmission is known. In this case, application software on the PC may send a print request or a facsimile transmission request to the image processing apparatus. In addition, a print request or a facsimile transmission request may be sent by application software on the image processing apparatus.

In this function, an image processing apparatus manages one printing process or facsimile transmission process as one job (print job or facsimile transmission job), and may limit acceptance of a job in view of a resource of a memory and a processing load. An image processing apparatus may simply have the number of jobs that can be accepted as a limiting value. Another image processing apparatus may determine whether to limit acceptance of a job depending on conditions of a resource or a processing load.

While an image processing apparatus limits acceptance of a job, the image processing apparatus notifies the transmission source of a reception error when a print request or a facsimile transmission request including image data is transmitted through a network. The transmission source that has sent the image data detects, from the received acceptance error, that printing or facsimile transmission cannot be performed.

Meanwhile, an image processing apparatus prepares a buffer to improve throughput in transmitting or receiving data through a network. A conventionally known image processing apparatus controls print job data existing in a buffer when receiving a print job through a network to perform printing efficiently (Japanese Patent Application Laid-Open No. 2009-83419).

Japanese Patent Application Laid-Open No. 2009-83419 suggests a process to delete a piece of print job data, of which specified time for printing is later than the other pieces of print job data existing in the buffer, and execute a print job of a high priority if the print job data to be received through a network is too large to be stored in the free space of the buffer.

SUMMARY OF THE INVENTION

In this case, even though the application software side on a PC or an image processing apparatus recognizes that a print request or a facsimile transmission request transmitted to the image processing apparatus through a network has been accepted, the image processing apparatus side may not generate a job and the associated data may be lost.

When application software on a PC or an image processing apparatus transmits a print request or a facsimile transmission request to an image processing apparatus, the application software establishes communication connection on a TCP/IP layer and performs communication. At this time, the image processing apparatus side prepares a buffer for the communication connection, temporarily stores in the buffer a print request or a facsimile transmission request including image data in the order of reception, and reads the request in the order of reception.

The image processing apparatus terminates the communication, and disconnects and shuts down the communication connection when whole data (i.e., to the last piece of data) of the print request or the facsimile transmission request is stored in the buffer. The image processing apparatus then accepts the received print request or the facsimile transmission request as a job and executes processing thereon.

At this time, the application software, which has transmitted the print request or the facsimile transmission request, on the PC or the image processing apparatus recognizes that the request has been accepted when the communication connection is shut down.

However, between the shut-down of the communication connection and the acceptance of the received print request or facsimile transmission request as a job by the image processing apparatus, the print request or the facsimile transmission request in the buffer may be deleted due to power disconnection of the image processing apparatus.

In other words, there is a problem that, even though the application software on the PC or the image processing apparatus recognizes that the print request or the facsimile transmission request has been accepted, the print request or the fax transmission request received by the image processing apparatus may be deleted in some cases.

The problem is likely to occur in a case where an image processing apparatus limiting acceptance of a job receives a request having a data size smaller than the buffer size.

It is the problem that may occur in a case where, for example, an image processing apparatus receives a request that may have a smaller data size than a buffer size in a state where processing of an already received job is time-consuming, and the processing load is high.

One embodiment is directed to a mechanism capable of detecting that a buffer shifts to full state before finishing to transfer a received job from the buffer to a queue.

According to an aspect of the disclosure, an information processing apparatus includes a first acquisition unit configured to acquire or obtain a data size of at least one facsimile transmission job, a second acquisition unit configured to acquire or obtain a buffer size of the image processing apparatus, a determination unit configured to determine whether the data size of the facsimile transmission job is smaller than or equal to the buffer size of the image processing apparatus, an adjustment unit configured to adjust the data size of the facsimile transmission job such that the data size exceeds the buffer size of the image processing apparatus if the determination unit has determined that the data size of the facsimile transmission job is smaller than or equal to the buffer size of the image processing apparatus, and a transmission unit configured to transmit the facsimile transmission job to the image processing apparatus.

Further features of the disclosure will become apparent from the following description of exemplary embodiments with reference to the attached drawings.

DESCRIPTION OF THE EMBODIMENTS

Hereinafter, exemplary embodiments of the disclosure will be described in detail with reference to the accompanying drawings. Meanwhile, the exemplary embodiments described below are not intended to limit the disclosure of the claims thereto. In addition, all combinations of the features described in the exemplary embodiments are not necessarily essential to the means of solving problems according to the disclosure.

<Description of System Configuration>

First, a first exemplary embodiment will be described.

Figure 1:
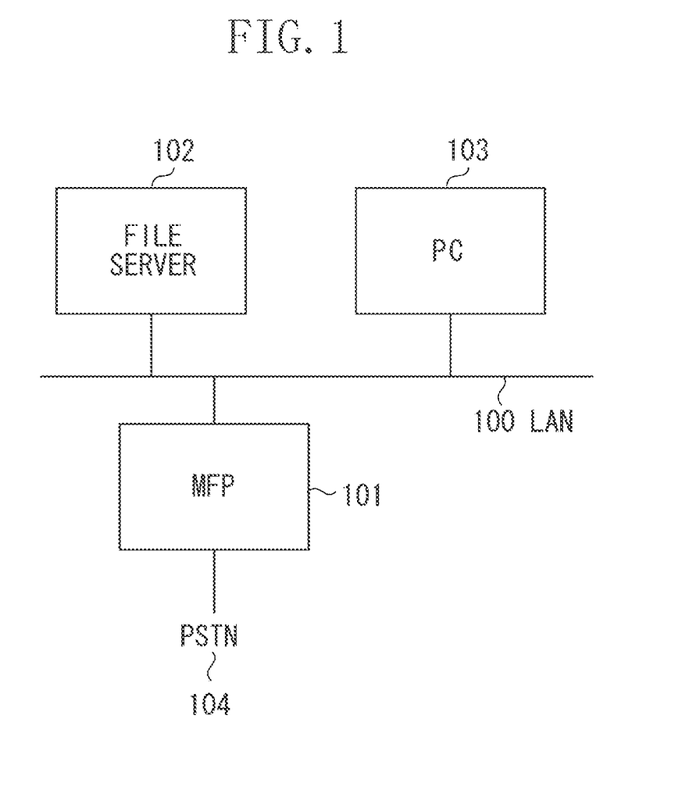
FIG. 1 is a diagram illustrating an image processing system.

FIG. 1 is a diagram illustrating an image processing system to which an information processing apparatus according to the present exemplary embodiment can be applied. In the present exemplary embodiment, an information processing apparatus performing predetermined functional processing is exemplified. The predetermined functional processing may be facsimile functional processing for transmitting transmission data and printing functional processing for printing print data, for example. Examples of the information processing apparatus described herein include a multifunction peripheral (MFP) for performing the predetermined functional processing described above.

In FIG. 1, an MFP 101, a file server 102, and a personal computer (PC) 103 are connected on a local area network (LAN) 100 in a mutually communicable manner. The MFP 101 is an example of an image processing apparatus.

The file server 102 is an example of an external server. The PC 103 is an example of a terminal configured to request processing of an image processing apparatus. In the exemplary embodiments, the whole system including the MFP 101, the file server 102, and the PC 103 is referred to as an image processing system. However, only the MFP 101 may be referred to as an image processing system.

The MFP 101 is connected to a public switched telephone networks (PSTN) 104 and can perform facsimile communication of image data with a facsimile apparatus (not illustrated).

Figure 2:
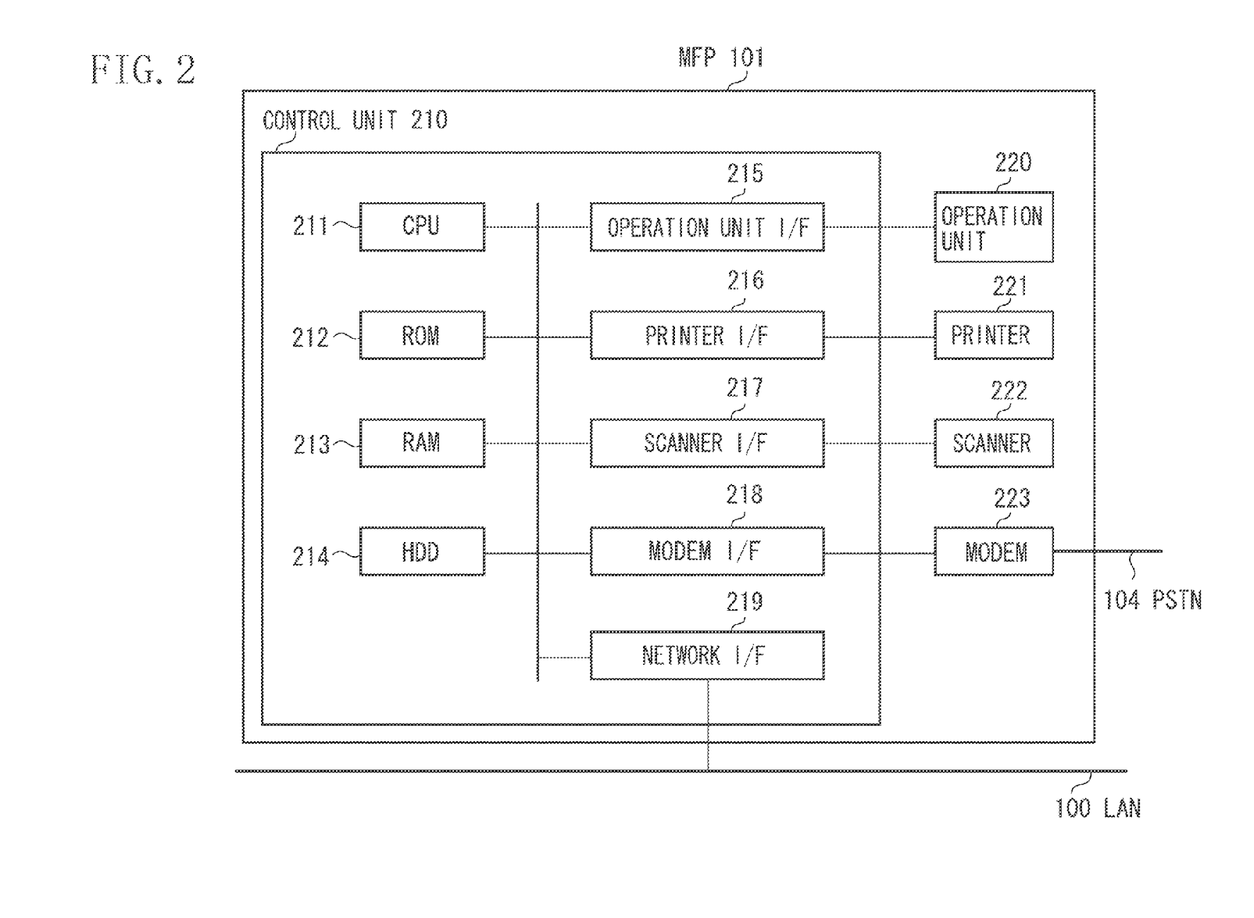
FIG. 2 is a hardware configuration diagram of a multifunction peripheral (MFP) illustrated in FIG. 1.

FIG. 2 is a hardware configuration diagram of the MFP 101 illustrated in FIG. 1.

In FIG. 2, a control unit 210 including a central processing unit (CPU) 211 is configured to control the operation of the whole MFP 101. The CPU 211 reads a control program stored in a read only memory (ROM) 212 and performs various controls in reading, printing, and communication. A random access memory (RAM) 213 is used as a main memory or a temporary storage area such as a work area of the CPU 211. In the MFP 101, the single CPU 211 performs each step of processing in a flowchart to be described below using one memory (the RAM 213 or a hard disk drive (HDD) 214), but other aspects are possible. For example, a plurality of CPUs and a plurality of RAMs or HDDs may cooperate to perform each step of processing in a flowchart.

The HDD 214 stores image data and various programs. An operation unit interface (I/F) 215 connects an operation unit 220 to the control unit 210. The operation unit 220 includes a liquid crystal display having a touch panel function and a keyboard, and serves as a receiving unit configured to receive an operation, an input, an instruction from a user.

A printer I/F 216 connects a printer 221 to the control unit 210. Image data to be printed by the printer 221 is transferred to the printer 221 from the control unit 210 through the printer I/F 216. The printer 221 then prints the received image data on a recording medium.

A scanner I/F 217 connects a scanner 222 to the control unit 210. The scanner 222 reads an image on an original to generate image data and inputs the image into the control unit 210 through the scanner I/F 217. The MFP 101 can perform file transmission or mail transmission of the image data generated by the scanner 222.

A modulator-demodulator (modem) I/F 218 connects a modem 223 to the control unit 210. The modem 223 performs facsimile communication of image data with a facsimile apparatus (not illustrated). A network I/F 219 connects the control unit 210 (the MFP 101) to a LAN 100. The MFP 101 transmits image data and information to and receives various kinds of information from an external apparatus (for example, the file server 102) on the LAN 100 using the network I/F 219.

Figure 3:
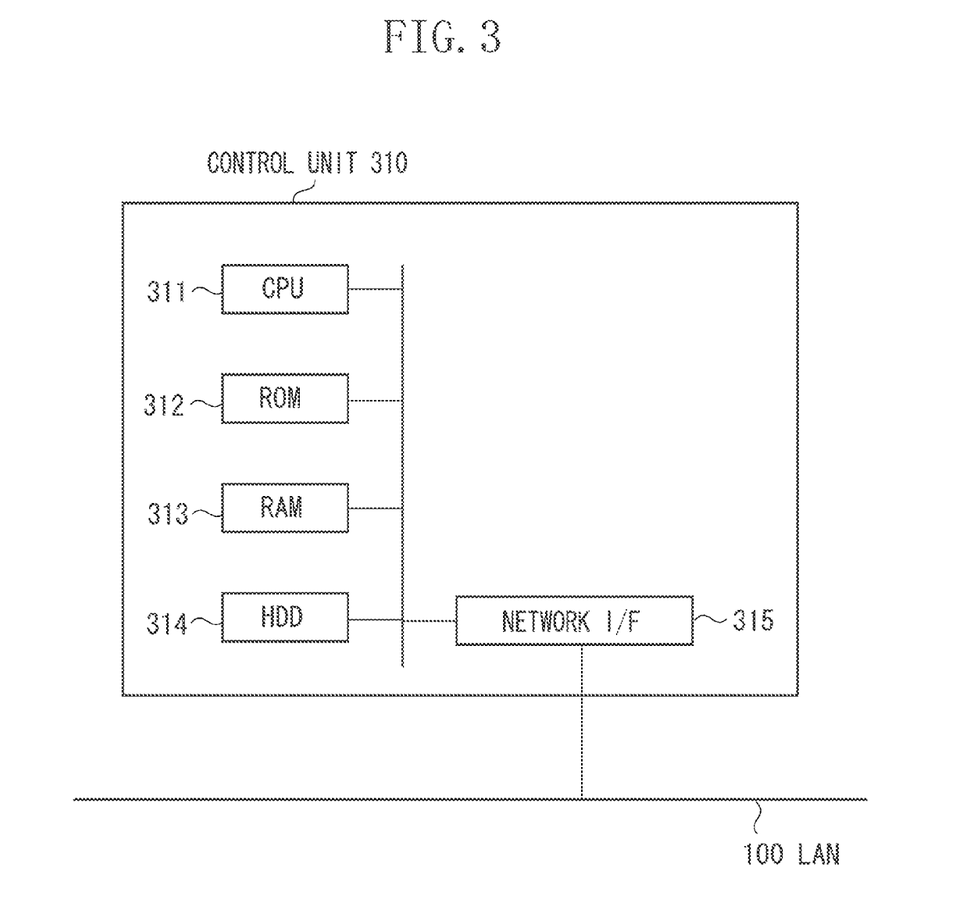
FIG. 3 is a hardware configuration diagram of a file server and a personal computer (PC).

FIG. 3 is a hardware configuration diagram of the file server 102 and the PC 103 illustrated in FIG. 1.

In FIG. 3, a control unit 310 including a CPU 311 is configured to control the operation of the whole file server 102. The CPU 311 reads a control program stored in a ROM 312 and performs various controls. A RAM 313 is used as a main memory or a temporary storage area such as a work area of the CPU 311. A HDD 314 stores image data and various programs.

A network I/F 315 connects the control unit 310 (the file server 102) to the LAN 100. The file server 102 transmits and receives various kinds of information to and from other apparatuses on the LAN 100 using the network I/F 315.

Figure 4:
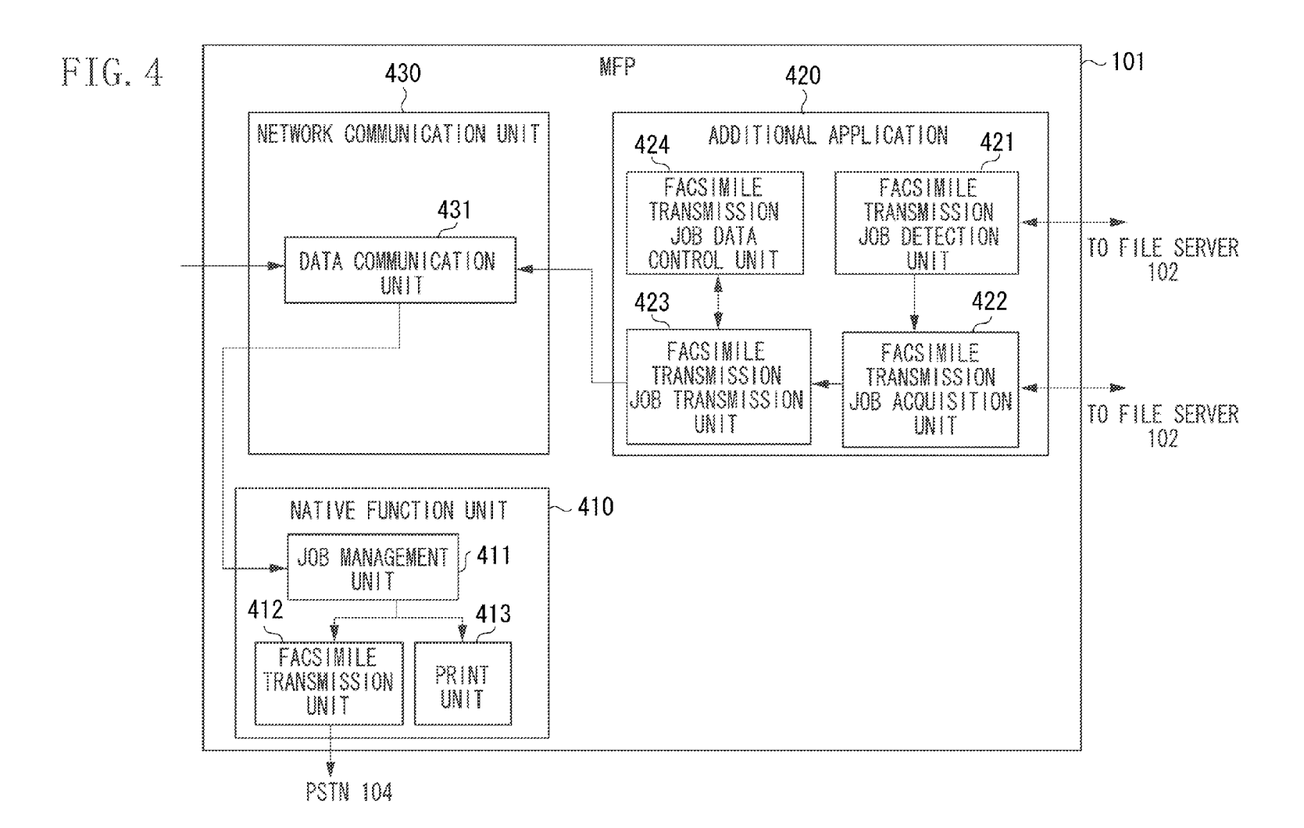
FIG. 4 is a software configuration diagram of the MFP.

FIG. 4 is a software configuration diagram of the MFP 101 illustrated in FIG. 1.

In FIG. 4, the MFP 101 can be broadly divided into three parts, i.e., a native function unit 410, an additional application 420, and a network communication unit 430. Each unit included in the native function unit 410 is normally provided in the MFP 101 while the additional application 420 is additionally installed in the MFP 101. The additional application 420 is an application based on Java (registered trademark) and allows easy addition of a function to the MFP 101. Meanwhile, other additional applications (not illustrated) may be installed in the MFP 101.

The network communication unit 430 is configured to perform network communication on a TCP/IP layer and exchange data transmitted or received on the TCP/IP layer with the native function unit 410 and the additional application 420.

A data communication unit 431 establishes a connection for network communication with the native function unit 410 or the additional application 420 on the TCP/IP layer according to a connection request from the PC 103 or the additional application 420.

In addition, the data communication unit 431 establishes a connection for network communication with the PC 103 and the file server 102 on the TCP/IP layer according to a connection request from the native function unit 410 or the additional application 420. In other words, the data communication unit 431 establishes a connection for network communication of the native function unit 410 and the additional application 420, with external apparatuses such as the PC 103 and the file server 102.

The data communication unit 431 prepares a volatile buffer for each connection for network communication to improve throughput at the time of data transfer to the native function unit 410 and the additional application 420. The data communication unit 431 temporarily stores the received data in the buffer and transfers the data to the native function unit 410 and the additional application 420.

The data communication unit 431 transfers the data stored in the buffer, in the order of storage in the buffer, to the native function unit 410 and the additional application 420. When the data communication unit 431 has stored all of the data received from an external apparatus in the buffer, the data communication unit 431 disconnects the connection for network communication with the external apparatus.

As described above, in the case of data communication from an external apparatus to the additional application 420, the data communication unit 431 transfers data to the additional application 420. In addition, the data communication unit 431 transfers data to the native function unit 410 if the data communication unit 431 receives data for a print request or a facsimile transmission request from an external apparatus.

A job management unit 411 is configured to receive facsimile transmission requests or print requests from the data communication unit 431 to be described below, and then generate and manage a job for each of the requests. First, the operation of the job management unit 411 when receiving a facsimile transmission request is described below. When the job management unit 411 receives a facsimile transmission request, the job management unit 411 generates a facsimile transmission job according to the request and registers the generated job in a facsimile transmission job management queue. If the registration in the facsimile transmission job management queue is completed, the job management unit 411 transmits, to the data communication unit 431, a facsimile transmission request response including information that the registration has been completed.

If the number of facsimile transmission jobs registered in the facsimile transmission job management queue reaches the maximum number of facsimile transmission jobs, the job management unit 411 transmits, to the data communication unit 431, a facsimile transmission request response including information that the registration has failed. The job management unit 411 transmits, to a facsimile transmission unit 412, an execution request for each facsimile transmission job registered in the facsimile transmission job management queue in the order of registration. The facsimile transmission job execution request includes a facsimile transmission job received by the data communication unit 431.

The facsimile transmission unit 412 receives the facsimile transmission job execution request from the job management unit 411 and executes the corresponding facsimile transmission job. In execution of a facsimile transmission job, the facsimile transmission unit 412 reads information such as a transmission destination and a use line described in the header of the facsimile transmission job. The facsimile transmission unit 412 then transmits image data included in the facsimile transmission job to a facsimile apparatus designated as a transmission destination, using a specified use line through the modem I/F 218, via a PSTN 104.

Figure 8:
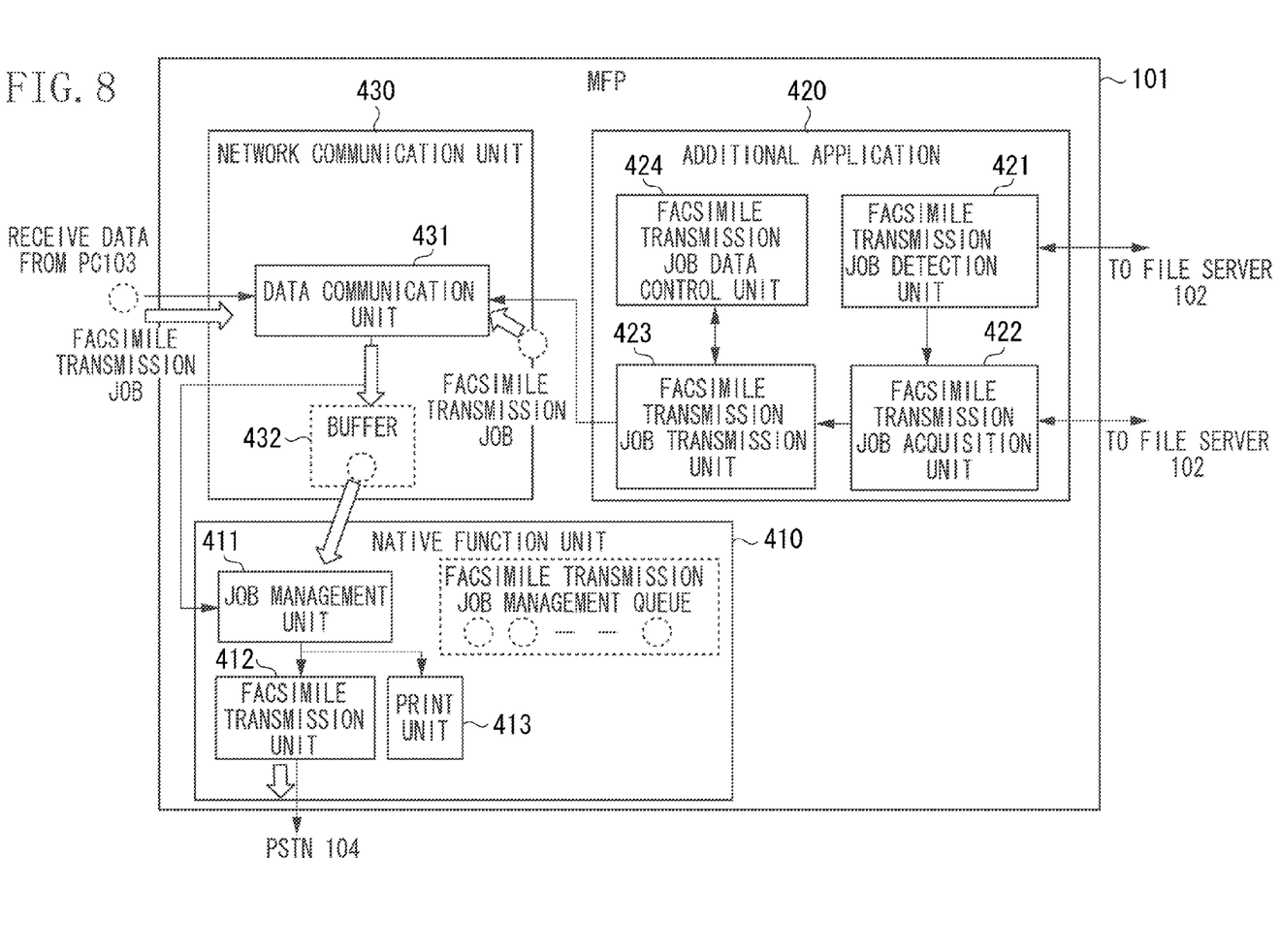
FIG. 8 is a diagram illustrating data flow up to execution of a facsimile transmission job.

FIG. 8 is obtained by adding, to FIG. 4, schematic data flow from reception of a facsimile transmission job by the data communication unit 431 to execution of the facsimile transmission job by the facsimile transmission unit 412 as described above. In the conventional technique, a problem occurs in a state where the facsimile transmission job management queue is full and cannot accept any new job, a facsimile transmission job is temporarily stored in a buffer 432, and communication with the transmission source of the facsimile transmission job has been completed. In this state, the facsimile transmission job stored in the buffer 432 is lost due to, for example, power disconnection of the image processing apparatus.

Next, an operation of the job management unit 411 when the job management unit 411 has received a print request will be described. If the job management unit 411 receives a print request, the job management unit 411 generates a print job according to the request and registers the job in a print job management queue. If the print job management queue has been registered therein, the job management unit 411 transmits, to the data communication unit 431, a print request response including information that the registration has been completed.

If the number of print jobs registered in the print job management queue reaches the maximum number of print jobs, the job management unit 411 transmits, to the data communication unit 431, a print request response including information that the registration has failed. The job management unit 411 transmits, to a print unit 413, an execution request for each print job registered in the print job management queue in the order of registration. Each of the print job execution requests includes a print job received by the data communication unit 431.

The print unit 413 receives the print job execution requests from the job management unit 411 and executes corresponding print jobs. When executing a print job, the print unit 413 reads print setting information described in the header of the print job. The print unit 413 then outputs, to the printer 221 through a printer I/F 416, image data included in the print job according to the print setting information.

In the present exemplary embodiment, the number of jobs is used as a determination criterion when the job management unit 411 determines that a job cannot be registered in a job management queue. However, a state of a resource, e.g., a memory, or a processing load may be used as a determination criterion.

The additional application 420 is configured to acquire or obtain a facsimile transmission job stored in the external file server 102 and transmit, to the native function unit 410, the acquired facsimile transmission job as a facsimile transmission request. The additional application 420 is an example of an application that realizes addition of a function to the MFP 101. Any application may be employed as long as a job to be acquired is a print job and the application can transmit the acquired print job as a print request to the native function unit 410.

A facsimile transmission job detection unit 421 is configured to monitor a predetermined shared folder of the file server 102 and detect whether a file including facsimile transmission job data has been stored. Upon detecting that the file has been stored, the facsimile transmission job detection unit 421 transmits a facsimile transmission job acquisition request to a facsimile transmission job acquisition unit 422.

According to the facsimile transmission job acquisition request from the facsimile transmission job detection unit 421, the facsimile transmission job acquisition unit 422 accesses the file server 102 and acquires or obtains the file including the facsimile transmission job data. The facsimile transmission job acquisition unit 422 transmits the acquired facsimile transmission job to a facsimile transmission job transmission unit 423.

The facsimile transmission job transmission unit 423 acquires or obtains the data size of the facsimile transmission job received from the facsimile transmission job acquisition unit 422 and inquires of a facsimile transmission job data control unit 424 whether to add dummy data to the facsimile transmission job. The facsimile transmission job transmission unit 423 adds, to the header of the facsimile transmission job, dummy data in a size corresponding to a value obtained as a result of the inquiry from the facsimile transmission job data control unit 424, which will be described below.

Since the dummy data is added to the header instead of the image data of the facsimile transmission job, the dummy data is ignored when the facsimile transmission unit 412 of the MFP 101 executes the facsimile transmission job, enabling facsimile transmission to the transmission destination without affecting the image data.

The facsimile transmission job data control unit 424 determines whether the data size of the facsimile transmission job is smaller than or equal to the buffer size of the transmission destination, i.e., the data communication unit 431 of the MFP 101 of the transmission destination, according to the inquiry from the facsimile transmission job transmission unit 423. If the data size of the facsimile transmission job is smaller than or equal to the buffer size of the data communication unit 431 of the MFP 101 of the transmission destination, the facsimile transmission job data control unit 424 calculates the difference between the buffer size of the data communication unit 431 and the data size of the facsimile transmission job.

The facsimile transmission job data control unit 424 returns the calculation value as an inquiry result to the facsimile transmission job transmission unit 423. On the other hand, if the data size of the facsimile transmission job is larger than the buffer size of the data communication unit 431 of the MFP 101 of the transmission destination, the facsimile transmission job data control unit 424 returns a value of zero as an inquiry result to the facsimile transmission job transmission unit 423.

Figure 5:
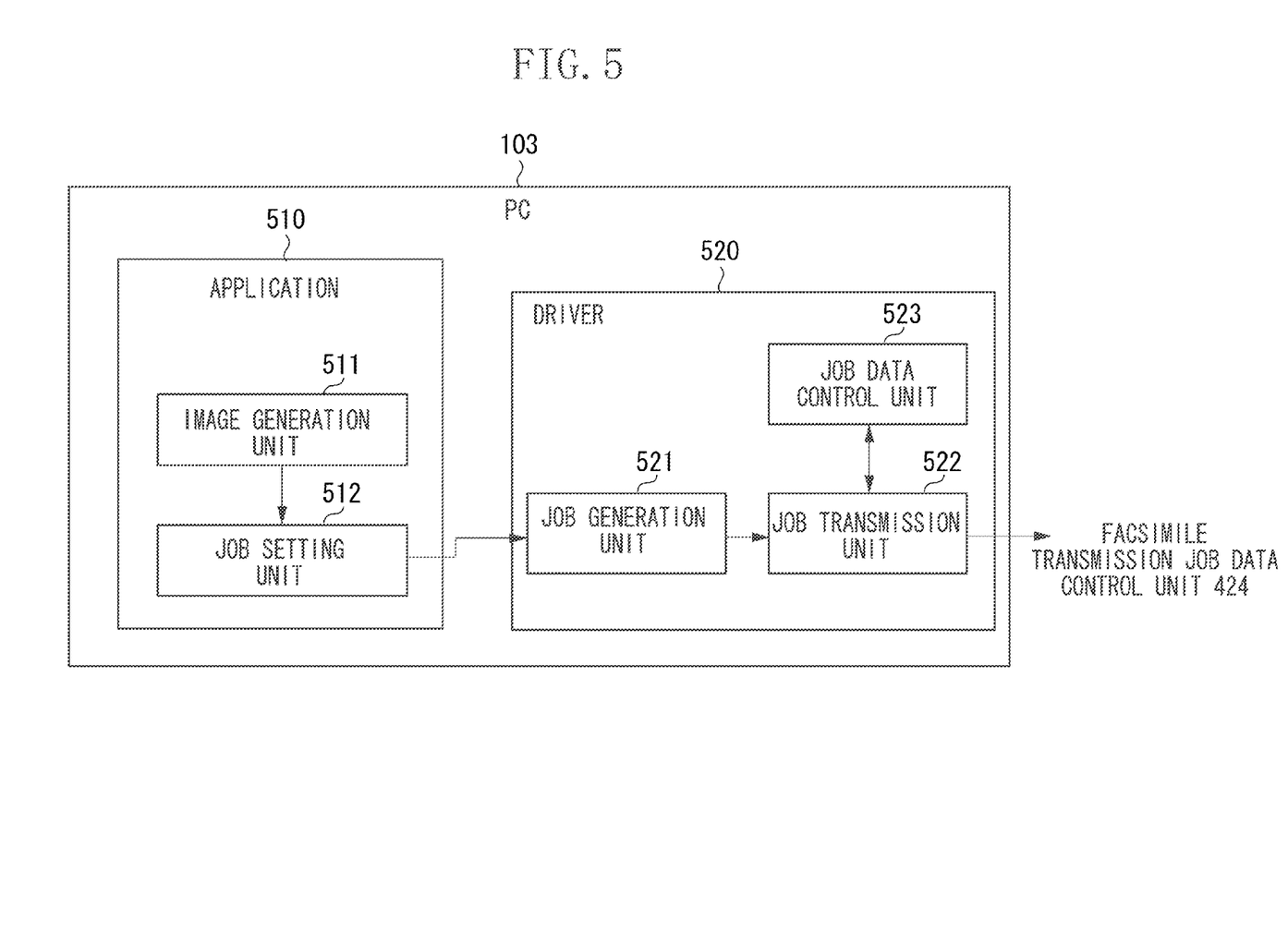
FIG. 5 is a diagram illustrating a software configuration on the PC illustrated in FIG. 1.

FIG. 5 is a diagram illustrating a software configuration of the PC 103 illustrated in FIG. 1 when an application 510 on the PC 103 transmits a facsimile transmission job or a print job to the MFP 101 via a driver 520. Practically, job data output from the driver 520 is temporarily stored in a spooler on an operating system (OS). However, the description of the process will be omitted in the present exemplary embodiment.

The application 510 is application software for creating a document and a graphic. The application 510 is instructed to perform a facsimile transmission or printing, for example, by a user operation through a user interface (not illustrated). In the present exemplary embodiment, a case where the application 510 is instructed to perform a facsimile transmission is described.

An image generation unit 511, triggered by a facsimile transmission instruction made by a user operation, generates image data for facsimile transmission and transmits the generated image data to a job setting unit 512. The job setting unit 512 transmits the image data and information such as a facsimile transmission number input by a user through a user interface (not illustrated) to a job generation unit 521 of the driver 520. The job generation unit 521 generates a facsimile transmission job based on the information received from the job setting unit 512 and transmits the facsimile transmission job to a job transmission unit 522.

The job transmission unit 522 acquires or obtains the data size of the facsimile transmission job received from the job generation unit 521 and inquires of a job data control unit 523 whether to add dummy data to the facsimile transmission job. The job transmission unit 522 adds, to the header of the facsimile transmission job, dummy data in a size corresponding to a value obtained as a result of the inquiry from the job data control unit 523, which will be described below. Since the dummy data is added to the header instead of the image data of the facsimile transmission job, the dummy data is ignored when the facsimile transmission unit 412 of the MFP 101 executes the facsimile transmission job, enabling facsimile transmission to the transmission destination without affecting the image data.

The job data control unit 523 determines whether the data size of the facsimile transmission job is smaller than the buffer size of the data communication unit 431 of the MFP 101, of the transmission destination according to the inquiry from the job transmission unit 522. If the data size of the facsimile transmission job is smaller than the buffer size of the data communication unit 431 of the MFP 101 of the transmission destination, the job data control unit 523 calculates the difference between the buffer size of the data communication unit 431 and the data size of the facsimile transmission job. The job data control unit 523 returns the calculation value as an inquiry result to the job transmission unit 522. If the data size of the facsimile transmission job is larger than the buffer size of the data communication unit 431 of the MFP 101 of the transmission destination, the job data control unit 523 returns a value of zero as an inquiry result to the job transmission unit 522.

Figure 6:
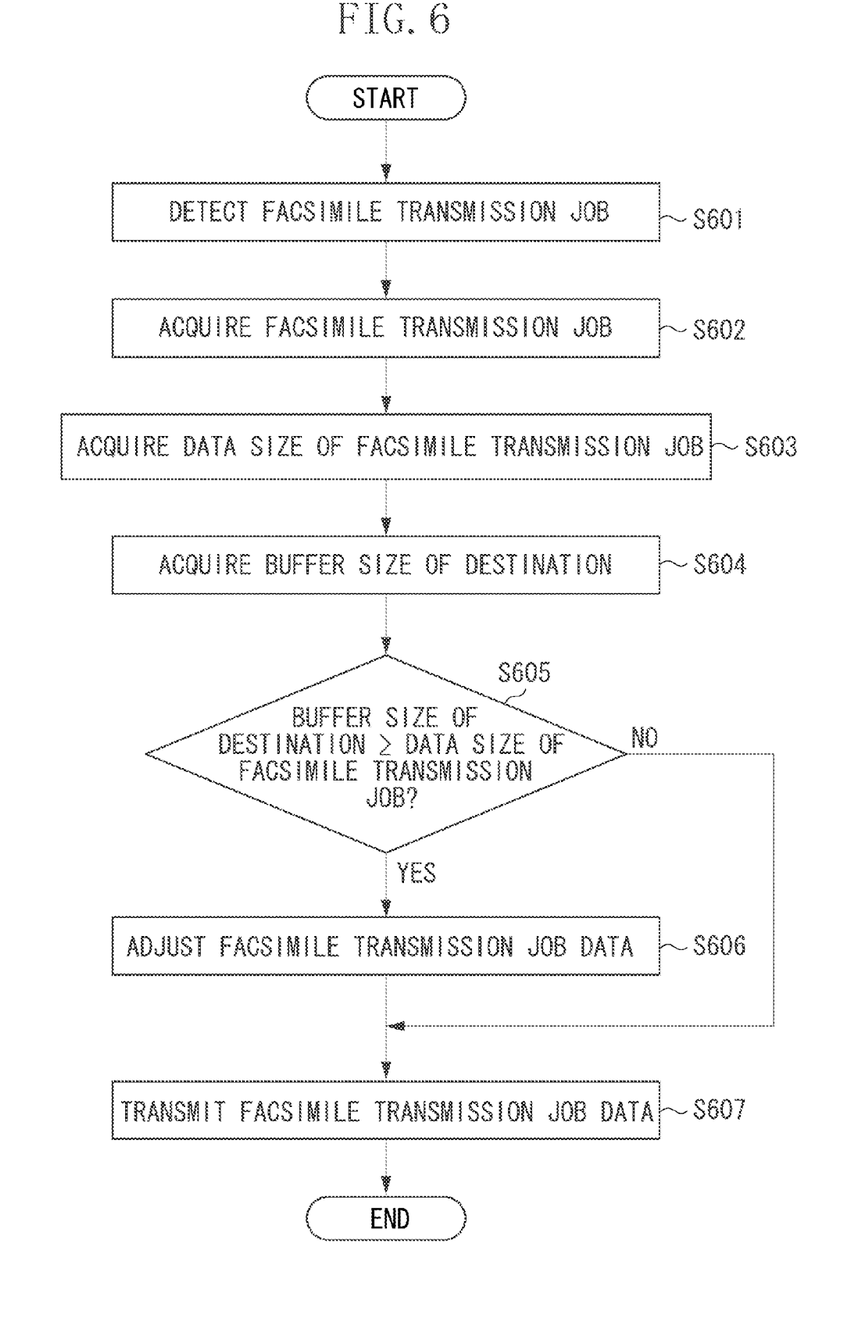
FIG. 6 is a flowchart illustrating a control method of an information processing apparatus.

FIG. 6 is a flowchart illustrating a control method of the information processing apparatus according to the present exemplary embodiment. This example illustrates operation performed by the additional application 420 to acquire or obtain a facsimile transmission job data stored in the file server 102 and perform a facsimile transmission via the native function unit 410. Each operation (step) is realized by the CPU 211 of the MFP 101 executing a control program stored in the HDD 214. In the following description, modules illustrated in FIG. 4, which is executed by the CPU 211, will be mainly described.

In step S601, the facsimile transmission job detection unit 421 monitors a predetermined shared folder of the file server 102, thereby detecting whether a file including facsimile transmission job data is created as a new file. The facsimile transmission job detection unit 421 may monitor an event provided as an OS function, as a detection method. Alternatively, the facsimile transmission job detection unit 421 may previously acquire or obtain a list of files stored in a folder to be monitored and compare with a list of files periodically acquired thereafter, thereby detecting whether a new file has been created.

Upon detecting that a new file has been created in the folder to be monitored, the facsimile transmission job detection unit 421 reads the file and checks whether the file is written in a format of facsimile transmission job data. If the file is written in the format of facsimile transmission job data, the facsimile transmission job detection unit 421 determines that a file including facsimile transmission job data has been created as a new file. The facsimile transmission job detection unit 421 then transmits, to the facsimile transmission job acquisition unit 422, a facsimile transmission job acquisition request including a file path.

In step S602, the facsimile transmission job acquisition unit 422 accesses the file server 102 and acquires or obtains a file stored at a position corresponding to the file path included in the facsimile transmission job acquisition request from the facsimile transmission job detection unit 421. The facsimile transmission job acquisition unit 422 then transmits the acquired facsimile transmission job to the facsimile transmission job transmission unit 423.

In step S603, the facsimile transmission job transmission unit 423 acquires or obtains the data size of the facsimile transmission job received from the facsimile transmission job acquisition unit 422. The facsimile transmission job transmission unit 423 then transmits, to the facsimile transmission job data control unit 424, a facsimile transmission job data adjustment value calculation request including the acquired data size.

Figure 9:
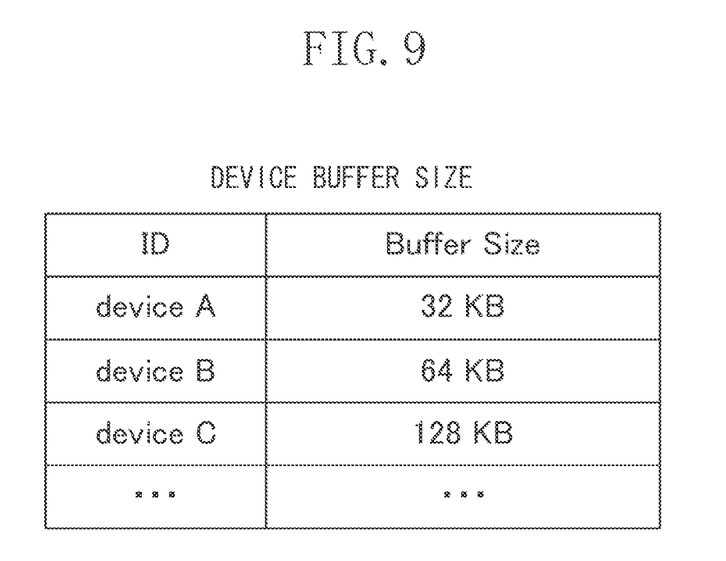
FIG. 9 illustrates a buffer size table managed by the MFP.

In step S604, the facsimile transmission job data control unit 424 acquires or obtains the buffer size of the data communication unit 431 of the MFP 101. The present exemplary embodiment is described assuming that the facsimile transmission job data control unit 424 holds a fixed value as the buffer size of the data communication unit 431 of the MFP 101. However, the buffer size of the data communication unit 431 may vary depending on the model or specification of the MFP 101. Therefore, the facsimile transmission job data control unit 424 may be configured to hold a device buffer size table as illustrated in FIG. 9, so that the facsimile transmission job data control unit 424 can acquire a buffer size according to the model of the transmission destination, i.e., the MFP 101.

In step S605, the facsimile transmission job data control unit 424 compares the data size included in the facsimile transmission job data adjustment value calculation request and the buffer size acquired in step S604. If the data size of the facsimile transmission job is smaller than or equal to the buffer size of the data communication unit 431 of the MFP 101 of the transmission destination (YES in step S605), the facsimile transmission job data control unit 424 calculates the difference between the buffer size of the data communication unit 431 and the data size of the facsimile transmission job.

The facsimile transmission job data control unit 424 returns the calculated value as a facsimile transmission job data adjustment value to the facsimile transmission job transmission unit 423. Then, the process proceeds to step S606.

If the data size of the facsimile transmission job is larger than the buffer size of the data communication unit 431 of the MFP 101 of the transmission destination (NO in step S605), the facsimile transmission job data control unit 424 returns a value of zero as a facsimile transmission job data adjustment value to the facsimile transmission job transmission unit 423. Then, the process proceeds to step S607.

In step S606, the facsimile transmission job transmission unit 423 adds, to the header of the facsimile transmission job, dummy data if the size of the dummy data is larger than the facsimile transmission job data adjustment value. Since the dummy data is added to the header instead of the image data of the facsimile transmission job, the dummy data is ignored when the facsimile transmission unit 412 of the MFP 101 executes the facsimile transmission job, enabling facsimile transmission to the transmission destination without affecting the image data.

In step S607, the facsimile transmission job transmission unit 423 accesses a port used for inputting facsimile transmission jobs, and establishes communication connection with the job management unit 411 via the data communication unit 431 of the MFP 101. The facsimile transmission job transmission unit 423 then transmits the facsimile transmission job data through the established communication connection.

Between step S606 and step S607, processing for determining whether the job stored in the reception buffer has been transmitted to a queue within a predetermined time is executed, whereby a reception error can be notified of to the transmission destination of the job.

As described above, according to the present exemplary embodiment, a facsimile transmission job having a size larger than the buffer size of the data communication unit 431 of the MFP 101 can be transmitted. Thus, a situation where the whole data of one facsimile transmission job is stored in the buffer 432 before the job management unit 411 registers the corresponding job in the facsimile transmission job management queue can be avoided. In other words, a situation where communication between the data communication unit 431 and the additional application 420 has been terminated before the job management unit 411 registers the job in the facsimile transmission job management queue can be avoided. Therefore, a situation where there is no facsimile transmission job in the job management unit 411 even though the additional application 420 recognizes that the facsimile transmission job has been input to the job management unit 411 can be avoided.

In addition, it is possible to cause application software on a PC or an information processing apparatus not to recognize that a print request or a facsimile transmission request has been received until the print request or the facsimile transmission request received by the information processing apparatus is managed as a job.

As a result, a situation where a print request or a facsimile transmission request received by the information processing apparatus is deleted even though application software on a PC or the information processing apparatus recognizes that the print request or the facsimile transmission request has been received can be avoided.

Further, since no processing is necessary by a basic function part in an OS level such as the network layer, especially the TCP/IP layer, on the information processing apparatus side, the problem can be solved at a relatively low cost.

In the present exemplary embodiment, a case where the additional application 420 inputs facsimile transmission jobs to the MFP 101 has been described, but the processing from step S603 to step S607 may be performed by the job transmission unit 522 and the job data control unit 523 of the driver 520 of the PC 103. In addition, when the additional application 420 or the application 510 inputs a print job, the size of data of the print job and the buffer size of the data communication unit 431 of the MFP 101 may be compared to adjust the data size of the print job.

Next, a second exemplary embodiment will be described.

In the second exemplary embodiment, an operation of the additional application 420 to check with the job management unit 411 whether a facsimile transmission job has been registered in a facsimile transmission job control key after the job is input will be described.

In the second exemplary embodiment, a flowchart illustrated in FIG. 7 will be described instead of the flowchart of FIG. 6 described in the first exemplary embodiment. Other configuration is similar to that described in the first exemplary embodiment and redundant description will be omitted.

Figure 7:
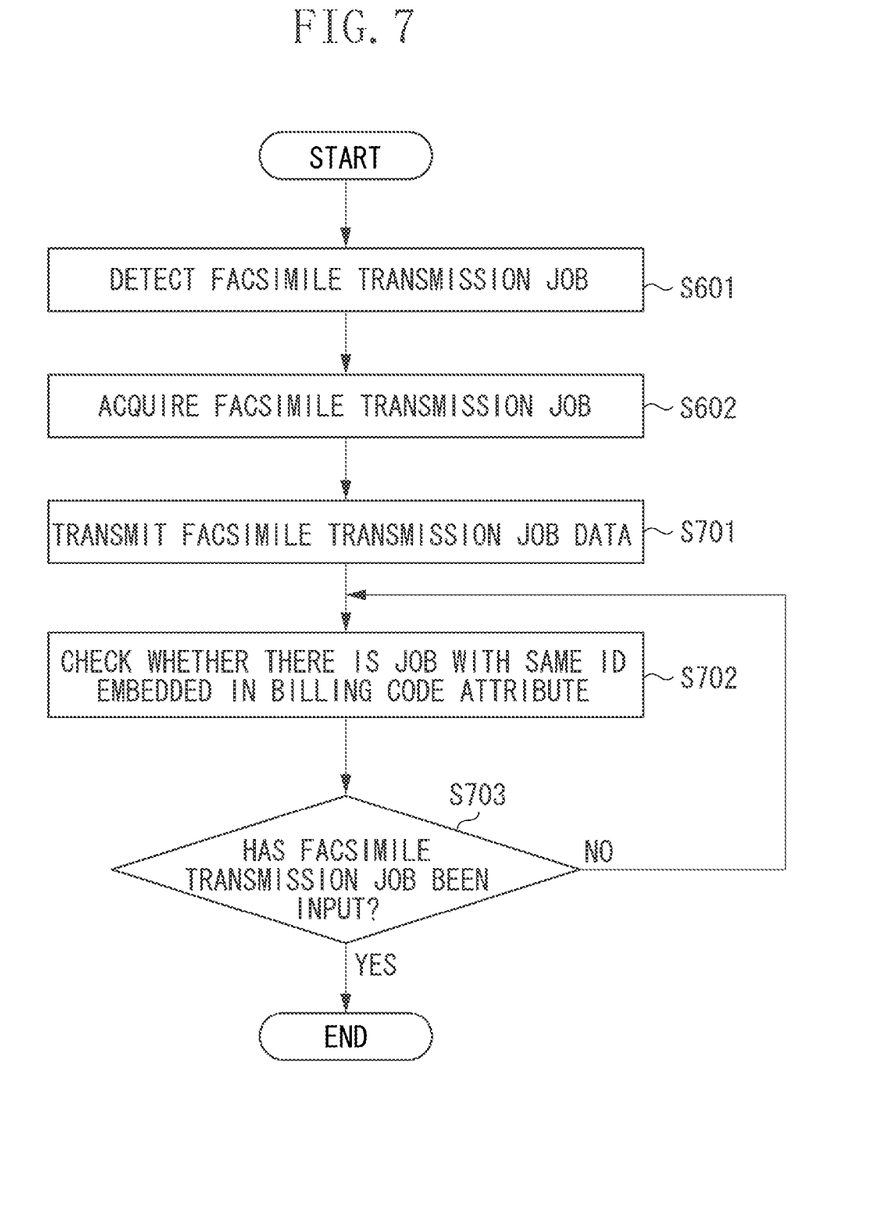
FIG. 7 is a flowchart illustrating a control method of an information processing apparatus.

FIG. 7 is a flowchart illustrating a control method of an information processing apparatus according to the present exemplary embodiment. The present exemplary embodiment is an example of an operation performed by the additional application 420 to acquire or obtain facsimile transmission job data stored in the file server 102 and carry out facsimile transmission for the facsimile transmission job data via the native function unit 410. Each operation (step) illustrated in the flowchart of FIG. 7 is realized by the CPU 211 of the MFP 101 executing a control program stored in the HDD 214. Steps S601 and S602 in FIG. 7 are similar to those of the first exemplary embodiment described above, and thus redundant description will be omitted here. In the following description, modules illustrated in FIG. 4 and executed by the CPU 211 will be mainly described.

In step S701, the facsimile transmission job transmission unit 423 embeds a unique identifier (ID), i.e., identification information, in a Billing Code attribute of the facsimile transmission job received from the facsimile transmission job acquisition unit 422. Next, the facsimile transmission job transmission unit 423 accesses a port for inputting facsimile transmission jobs, and establishes communication connection with the job management unit 411 via the data communication unit 431 of the MFP 101. The facsimile transmission job transmission unit 423 then transmits the facsimile transmission job data through the established communication connection.

In step S702, the facsimile transmission job transmission unit 423 acquires or obtains a list of jobs registered in the facsimile transmission job management queue from the job management unit 411. The facsimile transmission job transmission unit 423 then checks for a Billing Code attribute of each facsimile transmission job included in the acquired list, and checks whether there is any job in which the same ID as the ID embedded in step S701 is embedded in the Billing Code attribute.

If there is a job in which the same ID as the ID embedded in step S701 is embedded in the Billing Code attribute as a check result of step S702, in step S703, the facsimile transmission job transmission unit 423 determines that the facsimile transmission job has been input. If there is not any job in which the same ID as the ID embedded in step S701 is not embedded in the Billing Code attribute as a check result of step S702, the facsimile transmission job transmission unit 423 determines that the facsimile transmission job has not been input yet.

If the facsimile transmission job transmission unit 423 determines that the facsimile transmission job has been input (YES in step S703), the facsimile transmission job transmission unit 423 ends the processing.

On the other hand, if the facsimile transmission job transmission unit 423 determines that the facsimile transmission job has not been input yet (NO in step S703), the facsimile transmission job transmission unit 423 returns the processing to step S702 and the additional application 420 keeps a state where the facsimile transmission job is not input.

As described above, in the present exemplary embodiment, a situation where the additional application 420 erroneously determines that a facsimile transmission job has been input before the job management unit 411 registers the job in the facsimile transmission job management queue can be avoided. Therefore, a state where a facsimile transmission job has not been input to the job management unit 411 even though the additional application 420 recognizes that the facsimile transmission job has been input to the job management unit 411 can be avoided.

In the present exemplary embodiment, an ID is embedded in a Billing Code as information to uniquely identify a facsimile transmission job. A Billing Code is one of job attributes embedded to identify a billing destination upon charging for job execution. However, any other attribute can be used as long as the attribute has information capable of uniquely identifying a job such as a job name. In addition, in the present exemplary embodiment, the additional application 420 inputs facsimile transmission jobs to the MFP 101. However, the processing from step S701 to step S703 may be performed by the job transmission unit 522 of the driver 520 of the PC 103. Further, when the additional application 420 or the application 510 inputs a print job, information for uniquely identifying the job may be embedded in the print job to check whether the job has been input.

The disclosure can be realized by providing a program or instructions for realizing one or more function of the exemplary embodiments described above to a system or an apparatus through a network or a storage medium, and reading and executing the program or instructions by one or more processor in a computer of the system or the apparatus. Alternatively, the disclosure can be realized by a circuit for realizing one or more function (for example, an application specific integrated circuit (ASIC)).

According to the exemplary embodiments of the disclosure, it can be detected that a buffer shifts to a full state before a received job is transferred from the buffer to a queue.

Other Embodiments

Embodiment(s) of the disclosure can also be realized by a computer of a system or apparatus that reads out and executes computer executable instructions (e.g., one or more programs or sets of instructions) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodi- This application claims the benefit of Japanese Patent Application No. 2014-225401, filed Nov. 5, 2014, which is hereby incorporated by reference herein in its entirety.

What is claimed is:

1. An information processing apparatus comprising:
   a first acquisition unit configured to acquire a data size of a facsimile transmission job;
   a second acquisition unit configured to acquire a buffer size of an image processing apparatus;
   a determination unit configured to determine whether the data size of the facsimile transmission job is smaller than or equal to the buffer size of the image processing apparatus;
   an adjustment unit configured to adjust the data size of the facsimile transmission job so that the data size exceeds the buffer size of the image processing apparatus if the determination unit determines that the data size of the facsimile transmission job is smaller than or equal to the buffer size of the image processing apparatus; and
   a transmission unit configured to transmit the facsimile transmission job to the image processing apparatus.

2. The information processing apparatus according to claim 1, wherein the adjustment unit is configured to adjust the data size of the facsimile transmission job so that the data size exceeds the buffer size of the image processing apparatus by adding dummy data to a header of the facsimile transmission job.

3. The information processing apparatus according to claim 1, further comprising:
   an addition unit configured to add identification information to the facsimile transmission job;
   a third acquisition unit configured to acquire a facsimile transmission job list, including the facsimile transmission job registered in a queue of the image processing apparatus; and
   a second determination unit configured to determine whether identification information of any facsimile transmission job included in the facsimile transmission job list includes the identification information added by the addition unit.

4. The information processing apparatus according to claim 1, wherein the second acquisition unit is configured to acquire the buffer size of the image processing apparatus from a table indicating correspondence between a type of the image processing apparatus and the buffer size.

5. A control method comprising:
   acquiring a data size of a facsimile transmission job;
   acquiring a buffer size of an image processing apparatus;
   determining whether the data size of the facsimile transmission job is smaller than or equal to the buffer size of the image processing apparatus;
   adjusting the data size of the facsimile transmission job so that the data size exceeds the buffer size of the image processing apparatus if the determining has determined that the data size of the facsimile transmission job is smaller than or equal to the buffer size of the image processing apparatus; and
   transmitting the facsimile transmission job to the image processing apparatus.

6. The control method according to claim 5, wherein the adjusting adjusts the data size of the facsimile transmission job so that the data size exceeds the buffer size of the image processing apparatus by adding dummy data to a header of the facsimile transmission job.

7. The control method according to claim 5, further comprising:
   adding identification information to the facsimile transmission job;
   acquiring a facsimile transmission job list, including the facsimile transmission job registered in a queue of the image processing apparatus; and
   second determining whether identification information of the facsimile transmission job included in the facsimile transmission job list includes the identification information having been added by the adding.

8. The control method according to claim 5, wherein the second acquiring acquires the buffer size of the image processing apparatus from a table indicating correspondence between a type of the image processing apparatus and the buffer size.

9. A non-transitory computer-readable recording medium storing instructions that, when executed by a processor, cause the processor to perform operations comprising:
   acquiring a data size of a facsimile transmission job;
   acquiring a buffer size of an image processing apparatus;
   determining whether the data size of the facsimile transmission job is smaller than or equal to the buffer size of the image processing apparatus;
   adjusting the data size of the facsimile transmission job so that the data size exceeds the buffer size of the image processing apparatus if the data size of the facsimile transmission job is determined to be smaller than or equal to the buffer size of the image processing apparatus; and
   transmitting the facsimile transmission job to the image processing apparatus.

* * * * *